Aug. 10, 1965  R. GUDMESTAD  3,199,383
WIRE CUTTING AND STRIPPING DEVICE WITH BLADE HEATING
MEANS AND CAM AND ECCENTRIC ACTUATION MEANS
Filed Oct. 7, 1963  3 Sheets-Sheet 1

INVENTOR.
RAGNAR GUDMESTAD
BY
Lieben & Nilles
ATTORNEYS

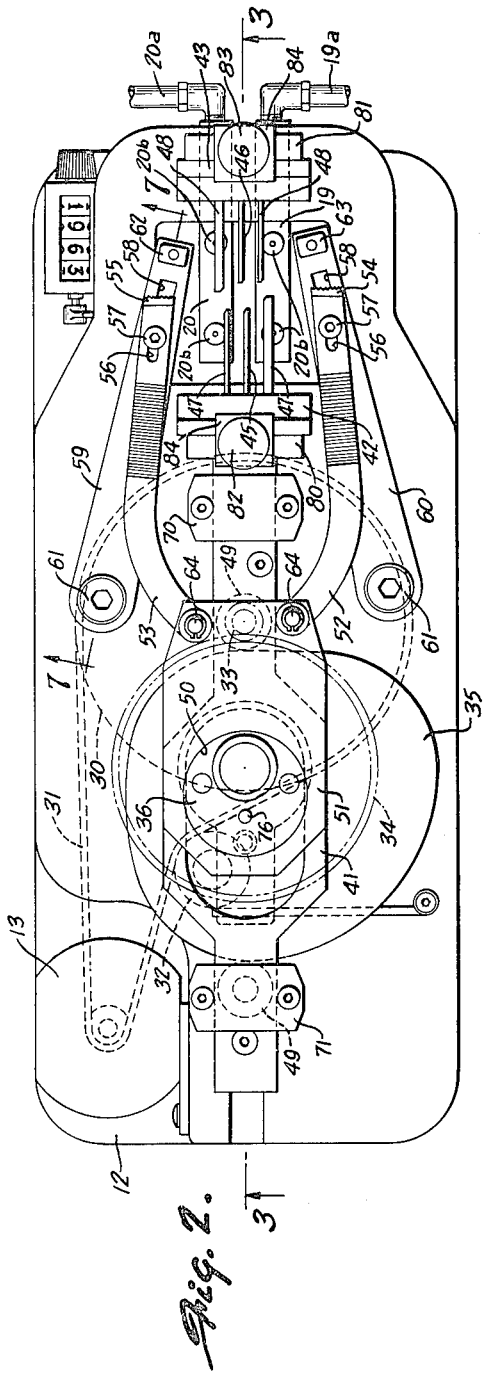

Aug. 10, 1965   R. GUDMESTAD   3,199,383
WIRE CUTTING AND STRIPPING DEVICE WITH BLADE HEATING
MEANS AND CAM AND ECCENTRIC ACTUATION MEANS
Filed Oct. 7, 1963   3 Sheets-Sheet 3

INVENTOR.
RAGNAR GUDMESTAD
BY
*Lieber & Nilles*
ATTORNEYS 3,199,383
WIRE CUTTING AND STRIPPING DEVICE WITH BLADE HEATING MEANS AND CAM AND ECCENTRIC ACTUATION MEANS
Ragnar Gudmestad, West Allis, Wis., assignor to Artos Engineering Company, Milwaukee, Wis., a corporation of Wisconsin
Filed Oct. 7, 1963, Ser. No. 314,302
8 Claims. (Cl. 81—9.51)

This invention relates to improvements in the art of wire cutting and stripping, and relates more particularly to improvements and construction and operation of machines for cutting and stripping wire stock, and to a heated stripping means in such machines for facilitating stripping of insulated wire stock.

The primary object of the present invention is to provide a simple and economical machine for rapidly and effectively cutting and stripping insulated wire or cable stock of any desired length regardless of the type of insulation to be operated upon.

It has become common practice in industry to employ various types of machines to advantage in the stripping of insulation from given areas of electrical wire to which terminals are to be subsequently applied. In most instances in the past, the cutting and stripping of the insulation coating has been satisfactorily performed purely by mechanical means without the aid of heat. However, due to the development of a variety of insulating materials having improved qualities, there has been an increasing trend toward the use of insulating coatings such as Teflon which have relatively low melting points; and especially in cases where a strict code is enforced, the cutting and stripping of such insulation has posed a problem.

In efforts to perform satisfactory cutting and stripping operations on these insulation materials, it has been heretofore proposed to employ stripping knives which are heated as by thermo-electric means. However, such equipment is costly, relatively complicated and potentially dangerous to the operator. Accordingly, the use of such thermo-electric heating means in wire cutting and stripping operations has been undesirably limited.

It is therefore another object of this invention to provide an improved wire cutting and stripping device which obviates all of the aforesaid objections and disadvantages of prior devices intended for the same general purpose.

Another object of this invention is to provide flame heated stripping means for the hot stripping of low melting point insulation from wire stock.

It is a further object of this invention to provide an independent heating means separate and apart from the stripping blades for heating the stripping blades to facilitate stripping of insulated wire stock.

It is another object of this invention to provide adjustment means to produce a variety of stripping lengths while severing insulated wire stock.

These and other more specific objects and advantages of the invention will be apparent from the following detailed description.

A clear conception of the several improved features constituting the present invention, and of a typical commercial machine for producing cut and stripped wire stock in accordance therewith may be had by referring to the drawings accompanying and forming a part of this specification, wherein like reference characters designate the same or similar parts in the various views:

FIG. 2 is a plan view in partial section of the machine of FIG. 1 with the cover and hand crank removed for clearness;

FIG. 3 is an elevation in partial section of the machine taken along line 3—3 of FIG. 2;

Figure 1:
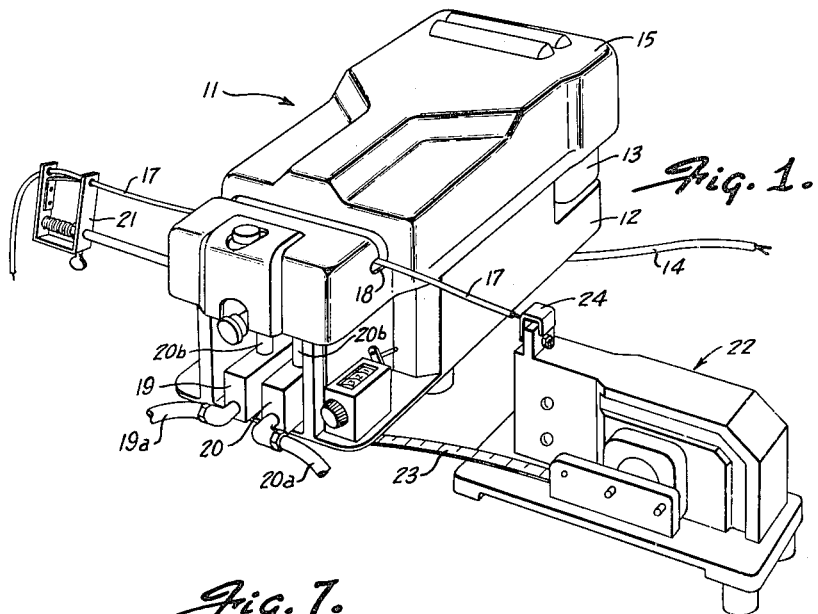
FIG. 1 is a perspective view of the improved wire cutting and stripping machine.
Figure 7:
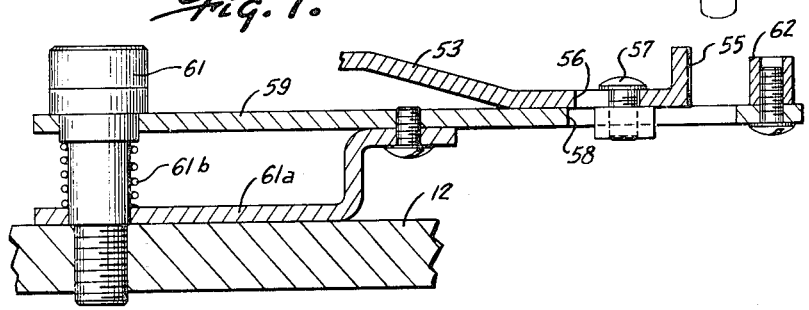
FIG. 7 is an elevation in partial section taken along the line 7—7 of FIG. 2.

Referring now to FIG. 1 the wire cutting and stripping device 11 comprises: a main housing 12 having an electric motor 13 powered by electrical conduit 14 connected to a source of voltage (not shown); a cover 15 detachably secured to the main housing 12; a length of insulated wire stock 17 fed through open recess 18 in the cover; heating units 19 and 20 connected to supply conduits 19a, 20a for heating stripping knives 47, 48 (FIG. 2); a wire guide member 21 attached to the main housing for guiding the wire stock 17 into recess 18; a trip switch assembly 22 movable a predetermined distance from the device 11 as measured by a tape 23; and a counter for the wire stock fed through said device, wherein the wire stock fed through said device contacts trip lever 24 of switch assembly 22 to initiate the cutting and stripping of the wire stock in device 11.

In general, the the device 11 is fed insulated wire stock 17 until the wire stock extends beyond the device to actuate trip lever 24. The lever 24 is located a desired distance from the device 11, as determined by the length of wire stock to be stripped and severed.

Wire stock is frequently insulated with a plastic insulation such as Teflon, which is somewhat difficult to strip cleanly and readily from the wire. It is advantageous to facilitate the stripping of such plastic insulation from the wire by heating the stripping knives. In the preferred embodiment, a pair of heating units 19 and 20, having a plurality of burners 20b on the burner units, are mounted in housing 12. The burners 20b are located subjacent the stripping knives so that the knives 47, 48 are heated by gas flames emanating from the burners. The burner gas is conducted through conduits 19a, 20a from a gas supply (not shown).

The stripping knives 47, 48 are thus heated continuously in the burner flames to facilitate the stripping action of the stripping knives during the stripping operation of the device 11.

Fluid heating of the stripping knives is believed to be of further advantage in that the heating units and burners are of simple construction and easy to maintain and replace. No temperature control is required, and other elaborate protective devices usually associated with electrically heated stripping knives are not necessary. The stripping knives, being subjected to a continuous heating are ready at all times to facilitate the stripping of all types of plastic insulated wire stock. Further, extinguishment of the flames allows rapid air cooling of the stripping knives.

Referring now to FIGS. 2 and 3, the motor 13 carried in housing 12 drives sheave 30, which also serves as a flywheel, through belt 31. A bearing 32, also carried by the housing serves as a belt-tightener. A pinion shaft 37, in bearing 38, is secured to sheave 30 and rotatable therewith. The rotation of pinion shaft 37 rotates pinion 33 to drive clutch-gear unit 34. Unit 34, in the preferred embodiment, is part of a one revolution clutch for driving cam 35 and eccentric 36 mounted coaxially on shaft 39 in bearing 40.

Primarily the rotation of cam 35 is to impart a longitudinal back and forth motion to tool slide 41 and attached tool holder 42. Thus as the cam 35 is rotated by clutch-gear unit 34, the tool holder means 42 is moved toward or away from tool holder means 43, which is secured to housing 12 as by a bolt 44. Carried by the tool holders 42 and 43 are cutting blades 45, 46 respectively and stripping blades 47, 48, respectively. The cam 35 engageable with tool slide 41 through roller means 49 thereby brings the cutting and stripping knives into and out of cutting and stripping position in a sequence determined by cam rotation and cam contour.

Simultaneously with cam rotation, is the rotation of eccentric 36. The periphery of eccentric 36 engages an opening 50 provided in stripping slide 51 to impart eccentric action to the slide 51 when the eccentric 36 is rotated. At one end of the stripping slide 51, a pair of strip levers 52 and 53 are pivotally mounted by pins 64. The outer ends of strip levers 52, 53 are provided with wire gripping members 54, 55, respectively, for sequential engagement with wire stock 17 as will be hereinafter described in greater detail.

A slot 56 is provided in each strip lever near the wire gripping member to receive a slidable fastener means 57, which passes through slot 56 and a slot 58 provided in each of jaw levers 59 and 60. The jaw levers 59, 60 are each pivotally attached to housing 12 as by bolts 61, and are each provided with a wire gripping segment 62, 63 respectively.

As the stripping slide 51 is positioned by the rotation of eccentric 36, the strip levers 52, 53 pivot to position jaw levers 59 and 60 about bolts 61, and, simultaneously the wire gripping members 54, 55 are positioned relative to wire gripping segments 62, 63 for alternately gripping wire 17 in accordance with eccentric 36 positioning of stripping slide 51.

As hereinabove described, the rotation of cam 35 positions the tool slide 41 to determine the position of cutting and stripping blades 45, 47 relative to cutting and stripping blades 46, 48, respectively. With eccentric 36 rotating as cam 35 rotates, a predetermined relation between the position of the cutting and stripping blades and the position of the wire gripping members 54, 55 and wire gripping segments 62, 63 is established for cutting and stripping wire 17.

The tool slide 41 is slidably mounted in slide blocks 70 and 71 carried by housing 12, and is provided with rollers 49 for engagement with the periphery of cam 35.

A disengaging lever 72 surrounds gear clutch unit hub 34a, and is provided with a recess 73 for receiving a spring 75 engageable with recess 35a of cam 35. The eccentric 36 is connected to cam 35 by a pin 76. Thus the cam 35 and eccentric 36 will rotate with gear clutch unit 34 for one revolution as determined by disengaging lever 72 which is engaged with the cam 35 through suitable lugs. When the lever 72a is swung left as by means of a solenoid, the lever 72 is permitted to drop into engagement with clutch unit 34 whereupon unit 34 and cam 35 rotate together until lever 72a again lifts 72 out of engagement with 34.

Figure 4:
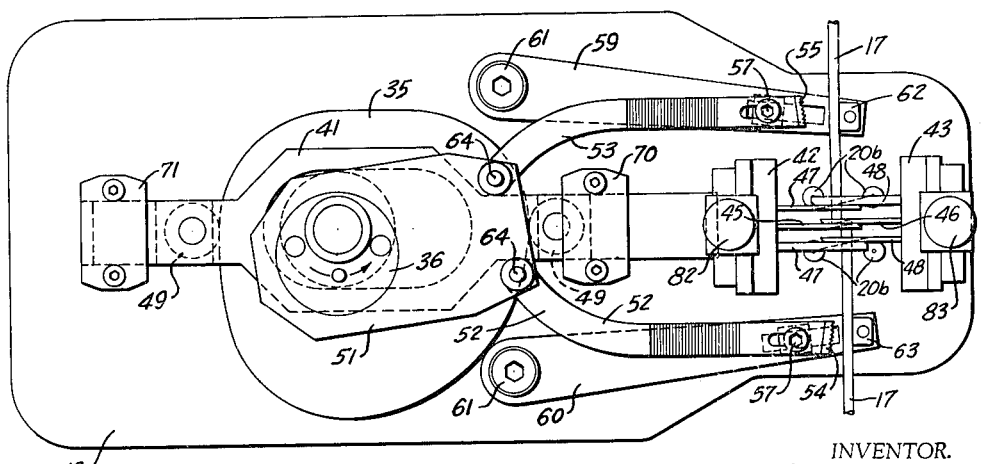
FIG. 4 is a plan view of a modification of the machine of FIG. 1 showing the strippers prior to engagement with the insulated wire stock.

Rotation of cam 35, as hereinabove described, moves tool holder 42 toward tool holder 43 to close the cutting and stripping blades on the wire 17 as shown in FIG. 4. The cam rotation from 0° to 90° closes the cutting and stripping knives, and the blades remain closed from 90° to 180° of cam rotation. The blades will open from 180° to 270° of cam rotation, and remain open from 270° to 360° of cam rotation.

Simultaneously with the rotation of cam 35 from 0° to 360°, is the rotation of eccentric 36 to position stripping slide 51. As strip levers 52, 53 move forward as a result of eccentric motion of slide 51, the wire 17 will be clamped against wire gripping segments 62, 63. Further motion of strip levers 52, 53 will cause jaw lever 59, 60 to pivot about bolts 61 to pull wire 17 from the stripping blades 47, 48 to occasion a stripping action.

In the preferred embodiment, a stripping action of wire 17 occurs at strip lever 52 and jaw lever 60 prior to the stripping action at strip lever 53 and jaw lever 59.

Referring to FIG. 4, it can be seen that the wire 17 has been severed by cutting blades 45, 46, wherein cutting blade 45 was positioned by cam 35 movement of tool slide 41 against tool holder 42 toward tool holder 43. The stripping slide 51 positioned by simultaneous rotation of eccentric 36 moves to position wire gripping clamp 54 toward wire gripping segment 63. Continued rotation of eccentric 36, positions clamp 54 against wire 17, and the wire is held between clamp 54 and segment 63 (see FIG. 5).

With the continued positioning of stripping slide 51 by eccentric 36, the strip lever 52 pivots jaw lever 60 away from the stripping blades, and, thus, the wire 17 gripped between clamp 54 and segment 63 is pulled away from the stripping blades to strip insulation off the severed end of wire 17. (See FIG. 6.)

Figure 5:
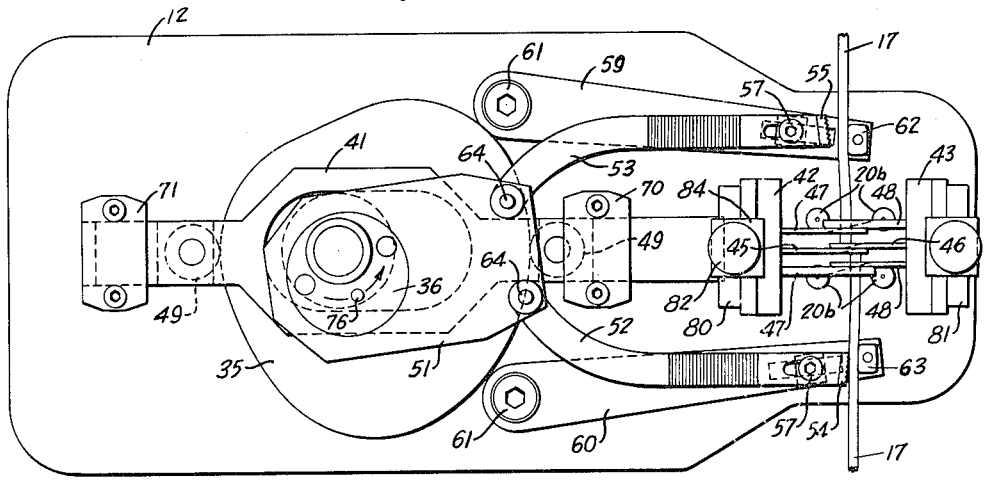
FIG. 5 is a view similar to FIG. 4 with one of the stripper members in engagement with the wire stock.
Figure 6:
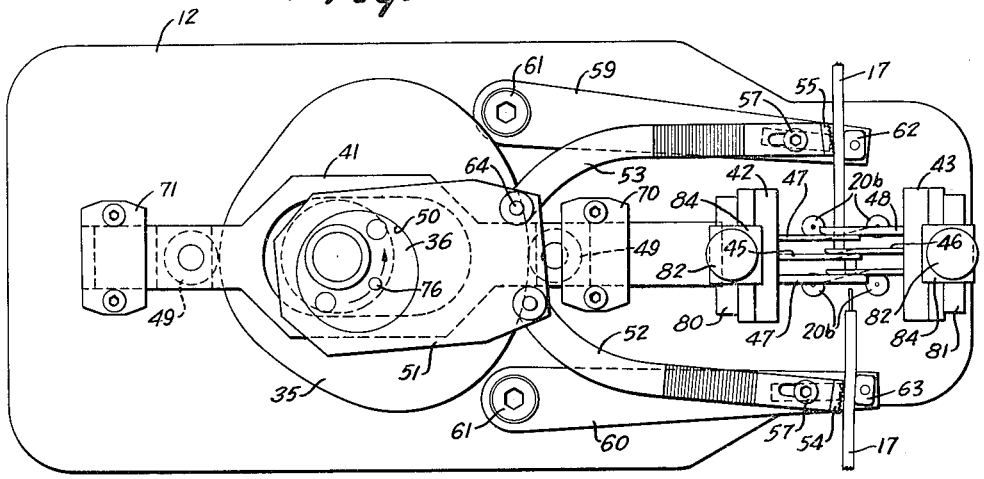
FIG. 6 is a view similar to FIG. 4 with the insulation stripped from the wire by one stripper member and the second stripper in engagement with the insulated wire.

It should be noted in reference to FIGS. 5 and 6, that, as the stripping action occurred at strip lever 52 and jaw lever 60, the clamp 55 integral with strip lever 53 being positioned, by stripping slide 51 action, toward wire gripping segment 62 to grip the wire 17 a predetermined distance from stripping blades 47, 48.

Continued rotation of eccentric 36 will result in the stripping of wire 17 as held by clamp 55 and segment 62.

Thus wire 17 fed into recess 18 of cover 15 will be brought through the device 11 a predetermined amount to trip switch assembly 22 to cause motor 13 to rotate cam 35 and eccentric 36 in the manner hereinabove described to sever the wire at cutting blades 45, 46 and strip the trailing end of wire 17, and, sequentially, the leading end of the wire 17 to be brought through to trip switch assembly 22 for the next wire cutting and stripping action.

The device 11 is provided with heating units 19 and 20 having burners 20b mounted in housing 12 substantially subjacent stripping knives 47, 48 for heating the knives by a gas flame emanating from the burners 20b. The knives 47, 48 being thus heated are able to easily penetrate the plastic insulation on the wire 17 when the knives 47 are moved toward knives 48 (as viewed in the drawings) by tool slide 41. The heated stripping knives also facilitate the stripping action of the knives during the pulling action imparted to the wire by strip levers 52, 53 as hereinabove described.

Thus, the cutting and stripping of wire is accomplished in a facile manner by the device 11 wherein heated stripping blades efficiently occasion stripping of plastic insulation from the wire in a predetermined sequence as described in relation to cam 35 and eccentric 36 operation.

Various adjustments can be made relative to device 11 as to the tool holders 42, 43, and as to the location of the stripping jaws to the blades or knives, and as to the stripping stroke itself. And, of course, a variety of cut and stripped wire lengths can be produced.

Particular reference is now made to FIG. 3 wherein tool holders 42, 43 are removable from their respective supports 80, 81 by removal of fasteners 82, 83 and clamps 84. Stripping lengths can be changed by locating the stripping knives at different distances from either side of the cutting knives 45, 46. The stripping knives 47, 48 will still remain within the heating zone of burners 20b.

The stripping levers 52, 53 carry fastener means 57 which slide in slots 58 of the jaw levers 59, 60, and the stripping stroke of the levers 52, 53 and levers 59, 60 can be varied by securing fastener means 57 at various positions along slot 56. In this manner, jaw levers 59, 60, at their wire grip segment end portions, can be brought nearer or farther from the stripping knives 47, 48. After the wire stripping operation, the levers 52, 53 on their backward movement will slide the fasteners 57 against the back end of the slot 58, thus pulling levers 59, 60 in toward the stripping blades.

While the preferred embodiment of the invention has been described in detail, it will be understood by those skilled in the art that various changes and modifications may be made without departing from the spirit and scope of the invention, and it is intended therefore that the appended claims cover all such changes and modifications.

Various modes of carrying out the invention are contemplated as being within the scope of the following claims particularly pointing out and distinctly claiming the subject matter which is regarded as the invention.

I claim:

1. In a wire cutting and stripping device having a main support, power means for said device, the combination of: wire cutting and stripping blades carried by said support, heating means carried by said support for heating said stripping blades, stripping lever means carried by said support for gripping and stripping said wire stock, cam means driven by said power means for positioning said wire cutting and stripping blades, an eccentric coaxial with said cam means driven by said power means, said stripping lever means positionable by said eccentric in timed relation to cam means rotation for stripping said wire stock.

2. The combination of claim 1 wherein said heating means comprises a plurality of burners located subjacent said stripping blades for providing a zone of heat for said stripping blades.

3. The combination of claim 1 wherein said stripping lever means includes a stripping slide positionable by said eccentric, a stripping lever pivotally mounted on said slide, jaw lever means pivotally mounted on said support and attached to said stripping lever, said wire stock gripped between said stripping lever and said jaw lever means during rotation of said eccentric, and said wire stock being stripped by said stripping lever and said jaw lever means upon continued rotation of said eccentric.

4. The combination of claim 3 wherein the length of wire stock stripped by said eccentric rotation is varied by varying the attachment between said stripping lever and said jaw lever means.

5. The combination of claim 1 wherein said stripping lever means includes a stripping slide provided with an opening coaxial with said eccentric and positionable thereby, a pair of stripping levers pivotally attached to said stripping slide, a wire gripping member located at an outer portion of each of said stripping levers, a pair of jaw levers pivotally carried by said support adjacent said pivotally mounted stripping levers, said jaw lever each attached to a stripping lever for positioning thereby, a wire gripping segment located at an outer portion of each jaw lever, wherein positioning of said stripping slide by said eccentric positions said wire gripping members into and out of wire stock gripping relation with said wire gripping segments in timed relation to cam means positioning of said wire cutting and stripping blades to cut and strip said wire stock.

6. Apparatus for cutting and stripping insulated wire stock comprising, a main support, power means for said device, wire cutting and stripping blades carried by said support, stripping lever means carried by said support for gripping and stripping wire stock, cam means driven by said power means for positioning said wire cutting and stripping blades, and an eccentric coaxial with said cam means driven by said power means, said stripping lever means being positionable by said eccentric in timed relation to said cam means for stripping said wire stock.

7. Apparatus for cutting and stripping insulated wire stock according to claim 6, wherein the stripping lever means includes a jaw lever pivotally mounted on the support, a stripping slide engageable with the eccentric, and a stripping lever pivotally attached to said jaw lever and to said stripping slide, said slide being positionable by rotation of said eccentric to impart a stripping action to the wire stock through cooperation of said stripping lever and said jaw lever.

8. Apparatus for cutting and stripping insulated wire stock according to claim 6, wherein the stripping lever means includes a pair of jaw levers pivotally carried by the support and adapted to engage the wire stock, a stripping slide block provided with an opening engageable with said eccentric for imparting movement to said slide block when said eccentric is rotated, and a pair of stripping levers each pivotally attached to said stripping slide block at one end and attached at the opposite end to one of said jaw levers, said pairs of jaw levers and stripping levers cooperating to strip said wire stock upon rotation of said eccentric.

References Cited by the Examiner

UNITED STATES PATENTS

| 1,595,793 | 8/26 | Levinger et al. | 81—9.51 |
| 2,811,063 | 10/57 | Eubanks | 81—9.51 |
| 2,880,635 | 4/59 | Harris | 81—9.51 |
| 2,886,995 | 5/59 | Bach et al. | 81—9.51 |
| 3,002,408 | 10/61 | Schwalm et al. | 81—9.51 |

FOREIGN PATENTS

| 1,046,133 | 12/58 | Germany. |
| 609,834 | 10/48 | Great Britain. |
| 664,925 | 1/52 | Great Britain. |

WILLIAM FELDMAN, *Primary Examiner.*

MILTON S. MEHR, *Examiner.*